United States Patent [19]
Wood, Jr. et al.

[11] Patent Number: 5,743,700
[45] Date of Patent: Apr. 28, 1998

[54] CONTAINER COVERING SYSTEM

[75] Inventors: Robert A. Wood, Jr.; Michael F. Ciferri, both of Palm City, Fla.

[73] Assignee: John Donovan Enterprises-FL., Inc., Stuart, Fla.

[21] Appl. No.: 694,324

[22] Filed: Aug. 8, 1996

[51] Int. Cl.⁶ ................................................. B60P 1/00
[52] U.S. Cl. .......................... 414/498; 296/98; 414/546; 414/786
[58] Field of Search .................... 414/491, 498, 414/546, 547, 555, 786; 296/98

[56] References Cited

U.S. PATENT DOCUMENTS

| | | |
|---|---|---|
| 3,977,719 | 8/1976 | Thurston . |
| 3,990,740 | 11/1976 | Bagwell .................... 296/100 |
| 4,172,614 | 10/1979 | Guido, Jr. .................. 296/98 X |
| 4,203,174 | 5/1980 | Shults ............................ 4/172 |
| 4,204,793 | 5/1980 | Lemaire .................. 414/498 X |
| 4,335,915 | 6/1982 | Knapp ........................ 296/98 |
| 4,516,802 | 5/1985 | Compton .................... 296/98 |
| 4,624,494 | 11/1986 | Huppert ...................... 294/26 |
| 4,659,134 | 4/1987 | Johnson ...................... 296/98 |
| 4,740,029 | 4/1988 | Tuerk ........................ 296/100 |
| 4,842,323 | 6/1989 | Trickett ...................... 296/98 |
| 4,981,317 | 1/1991 | Acosta ........................ 296/98 |
| 4,981,411 | 1/1991 | Ramsey ...................... 414/487 |
| 5,004,032 | 4/1991 | Pedersen .................... 160/84.1 |
| 5,031,955 | 7/1991 | Searfoss ...................... 296/98 |
| 5,050,924 | 9/1991 | Hansen ...................... 296/100 |
| 5,054,840 | 10/1991 | Wilhite ...................... 296/98 |
| 5,058,956 | 10/1991 | Godwin, Sr. ................ 298/23 |
| 5,060,995 | 10/1991 | Goldstein et al. ........... 294/19.1 |
| 5,125,713 | 6/1992 | Willingham et al. ........ 296/98 |
| 5,238,287 | 8/1993 | Haddad, Jr. ................. 296/98 |
| 5,240,303 | 8/1993 | Hageman .................... 296/98 |
| 5,275,459 | 1/1994 | Haddad, Jr. ................ 296/100 |
| 5,292,169 | 3/1994 | O'Brian ...................... 296/98 |
| 5,388,882 | 2/1995 | Russell et al. .............. 290/98 |
| 5,498,057 | 3/1996 | Reina et al. ................ 296/100 |
| 5,542,807 | 8/1996 | Kruzick .................... 414/498 X |

FOREIGN PATENT DOCUMENTS

| | | |
|---|---|---|
| 2268718 | 1/1994 | United Kingdom . |
| WO94/04392 | 3/1994 | WIPO . |

*Primary Examiner*—David A. Bucci
*Attorney, Agent, or Firm*—Banner & Witcoff, Ltd.

[57] ABSTRACT

A covering system for covering a transportable container with a tarp. The covering system includes a covering device provided with an extendable tarp. The covering device is mounted on a support structure which is manipulable to position the covering device to enable covering of a container which is unsupported by the vehicle. The covering device is preferably mounted to a hook arm which also functions to load the container onto the vehicle after the container is covered.

20 Claims, 5 Drawing Sheets

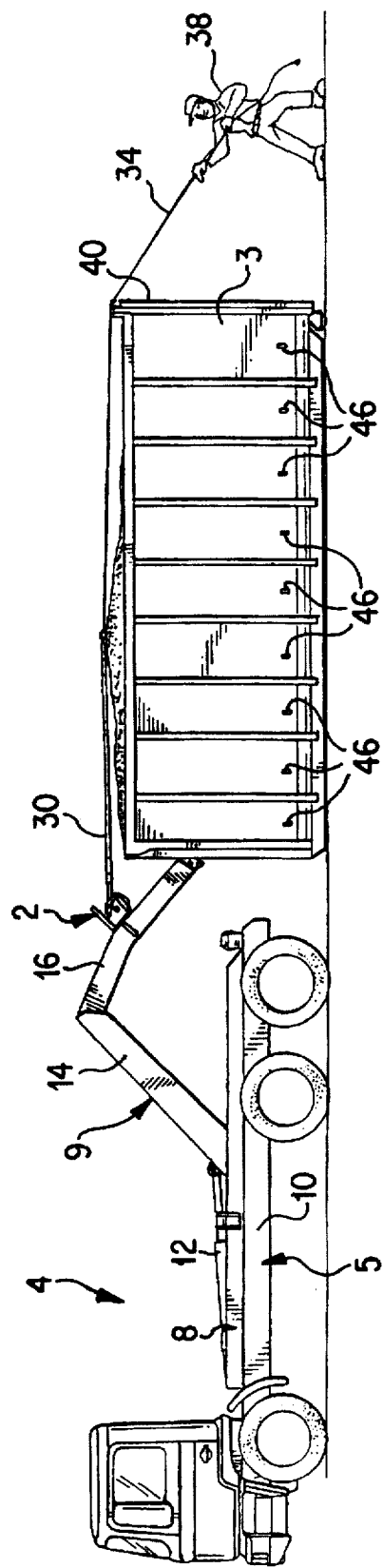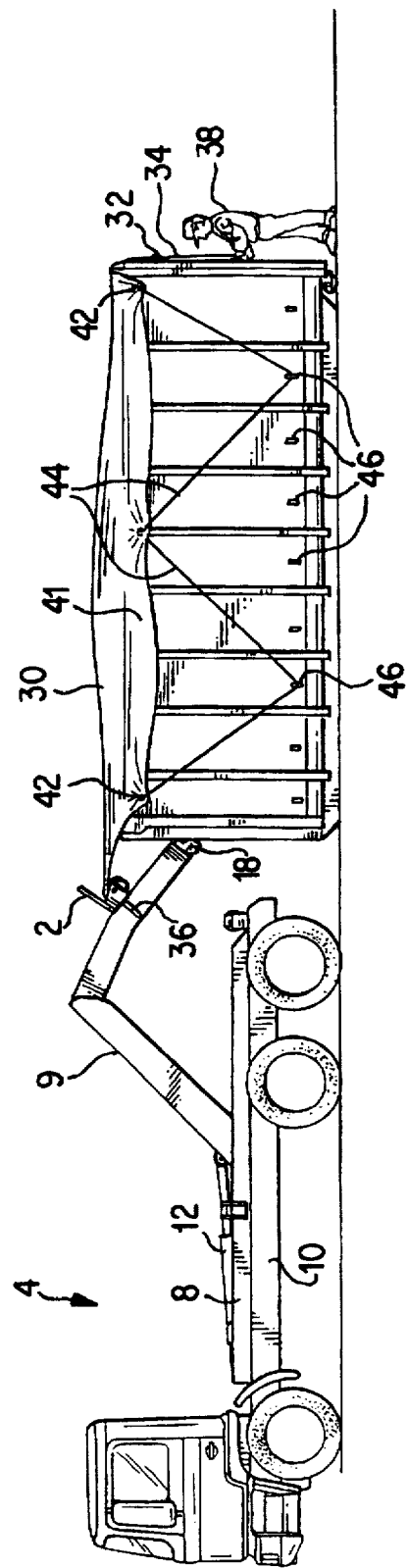

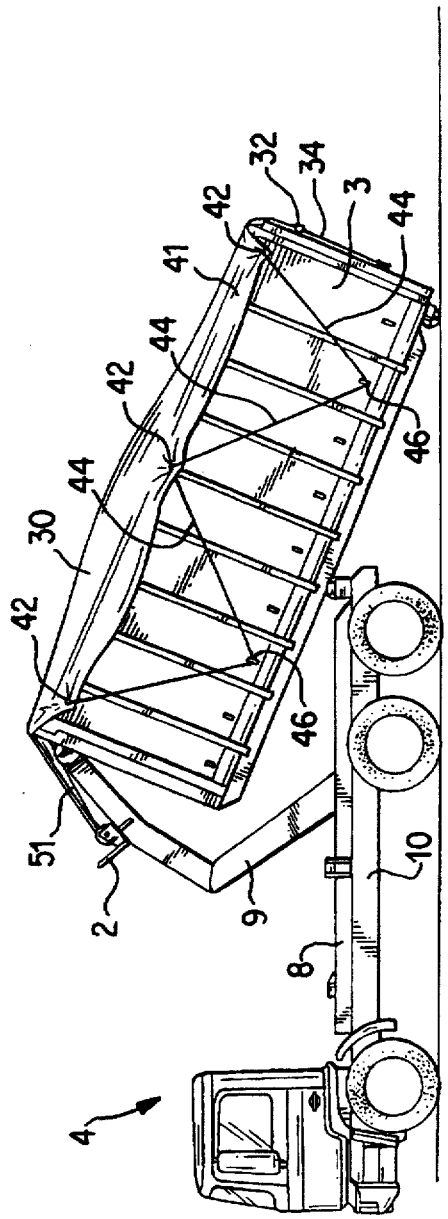
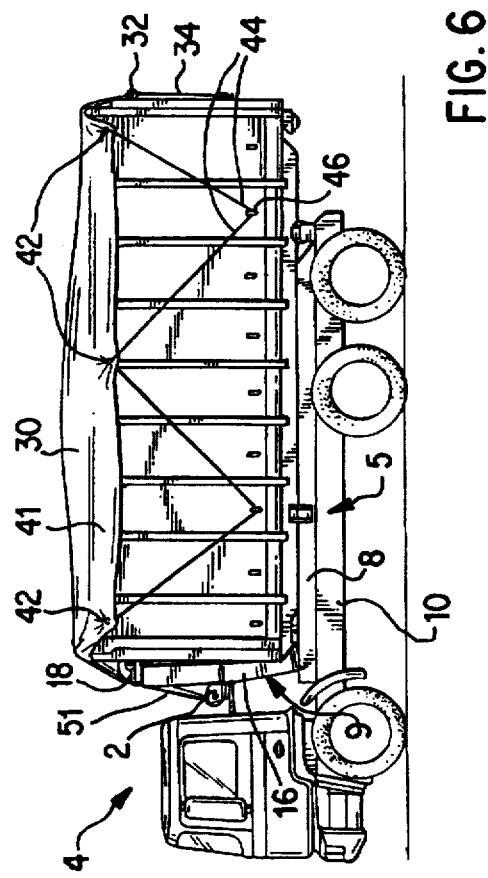
FIG. 5
FIG. 6

CONTAINER COVERING SYSTEM

FIELD OF THE INVENTION

The present invention relates to a system for covering containers with a tarp.

BACKGROUND OF THE INVENTION

During the transportation of materials (e.g., garbage and waste) in an open container, it is often necessary to cover the container in order to prevent the materials from being blown out of it. Known covering systems typically utilize a tarp to cover such open containers. The tarp is generally rolled on a bar of the covering device prior to use. Over the years, several types of covering devices have been developed for dispensing and retracting the tarp. Some of the devices are manually operated, while others are equipped with a hydraulic, pneumatic, or electric system for an automatic covering operation.

Covering devices have commonly been mounted to a truck in order to facilitate covering of a container supported by the truck's chassis. To ensure that the tarp retains the loaded material in the container during transport, the tarp must be securely fastened onto the container along its entire periphery. The tarp is secured by an operator climbing up on the container and manually pulling the tarp down and fastening its edges to the sides of the container. Accordingly, due to the size of the truck and the height of the container walls, an operator must work considerably high off the ground level. Such an operation not only increases the risk of injury for the operator, but also makes securing of the tarp more difficult.

Covering devices should clear the top of the container for easier dispensing of the tarp, but be tight to the forward edge during transport to prevent loss of material. As a result, covering devices have in the past been mounted on a fixed support at a level even with the top of the container (e.g., U.S. Pat. No. 5,031,955). While this construction may be suitable for certain loads, difficulty in covering the container is realized with heaping loads which exceed the top of the container. Moreover, a fixed height covering device is not feasible for vehicles which haul containers having walls of differing heights. To accommodate containers with sidewalls of varying heights, covering devices have also been supported by special elevating structures (e.g., U.S. Pat. No. 5,238,287). Although the elevating structure enables the covering device to be repositioned, it adds extra expense and complexity to the vehicle. Moreover, the fluid cylinders used have had a limited stroke which has not accommodated the full range of container wall heights.

To alleviate some of the difficulties and risks associated with covering containers which are separable from the track, covering devices have been mounted directly to the containers. In this way, the tarp may be dram over the open top of the container before the container is loaded on the truck. As a result, the covering process can be more easily and safely accomplished with the container at ground level. However, since there are many more containers than trucks, a large inventory of covering devices are required. Further, many of the covering devices remain idle on any given day as the containers are unused or loaded and awaiting transport.

SUMMARY OF THE INVENTION

The present invention pertains to an improved covering system for containers. In accordance with the present invention the covering system includes a covering device provided with an extendable tarp. The covering device is mounted on a support structure which is manipulable to position the covering device so as to enable the covering of a container which is unsupported by the vehicle. The covering device is preferably mounted to a hook arm which also functions to load the container onto the vehicle after the container is covered.

With this construction, the invention maximizes efficiency by requiring only one covering device per vehicle rather than one per container. Covering of the containers can be accomplished at ground level to reduce the risk of injury and ease the difficulty of the operation. Further, by mounting the covering device to the hook arm, the benefits can be achieved without additional support and elevating equipment. Also, the operation of the hook arm causes the covering device to be tucked beneath the top of the container to avoid the formation of a stream of air beneath the tarp during transport.

These and other objects, features and advantages of the present invention will become more apparent and fully understood from the following detailed description of the preferred embodiments, taken in connection with the appended drawings.

BRIEF DESCRIPTION OF THE DRAWINGS

FIG. 3 is a side view of the vehicle and a container on the ground being covered with a tarp.

FIG. 4 is a side view of the vehicle and the container, wherein the tarp is secured to the container.

FIG. 5 is a side view of the vehicle and the container being pulled on to the vehicle.

FIG. 6 is a side view of the vehicle with the container completely loaded on the vehicle for transportation.

DETAILED DESCRIPTION OF THE PREFERRED EMBODIMENTS

Figure 1:
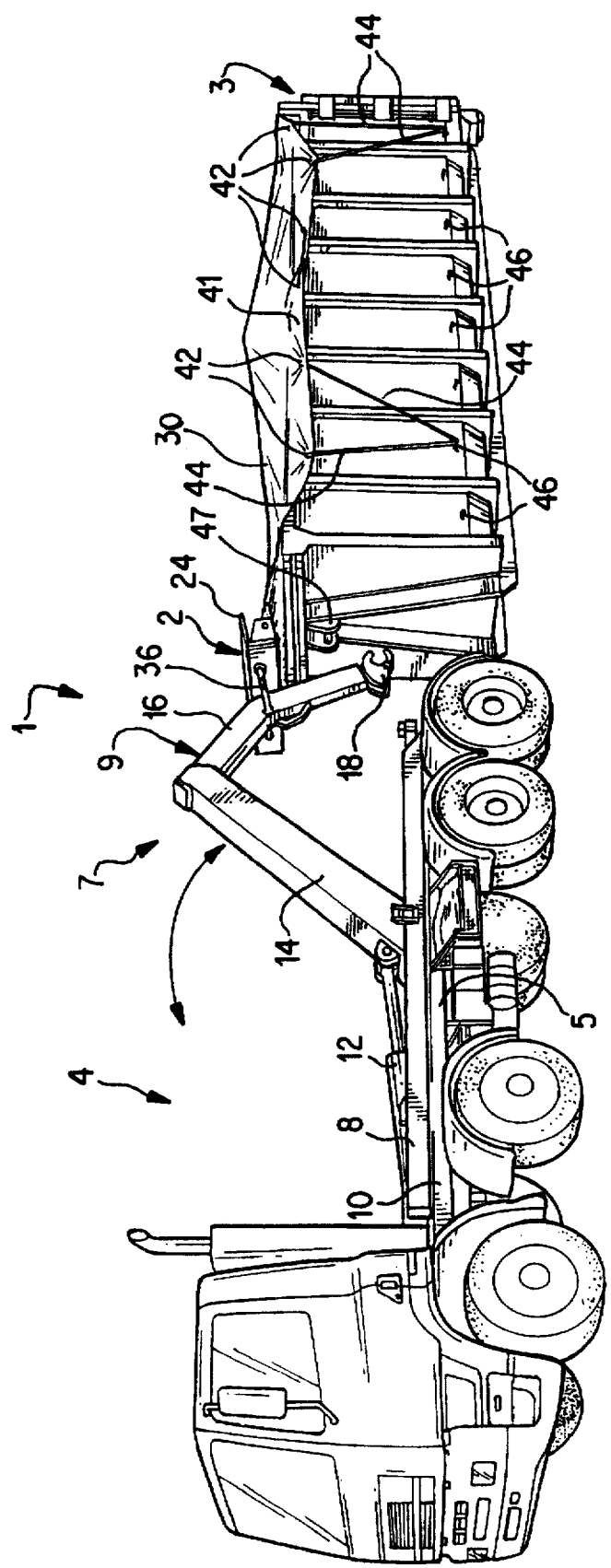
FIG. 1 is a perspective view of a vehicle with a covering device in accordance with the present invention.

The present invention pertains to a covering system 1 which includes a covering device 2 mounted on a support structure 7 (FIGS. 1 and 3–7). The support structure preferably includes a hook arm 9 which is preferably attached to a vehicle as a part of a hook lift truck 4. In one preferred construction, hook arm 9 is pivotally attached to a framework 8 by a transverse pin (not shown). Framework 8, in turn, is mounted on the chassis 10 of track 4. A fluid cylinder 12 or other actuator(s) is provided to swing hook arm 9 about the transverse pivot axis. Hook arm 9 includes a base segment 14 and a distal segment 16 joined generally at about a 90° angle relative to each other; although this orientation can be varied. A hook 18 or other grasping element is fixed to the free end of distal segment 16 for grasping and moving container 3 onto and off of vehicle 4.

Figure 2:
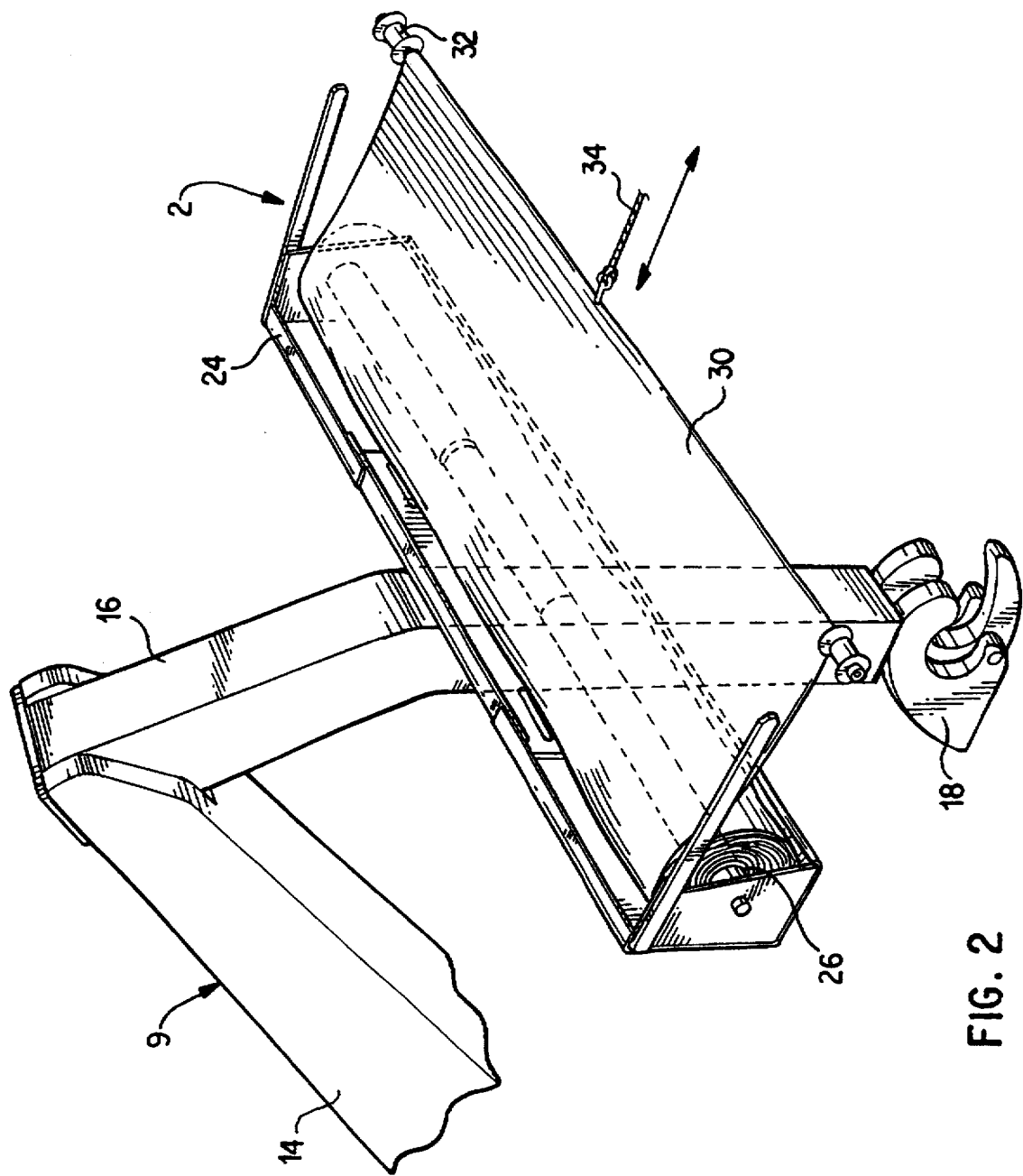
FIG. 2 is a partial, perspective view of a hook arm of the vehicle with the covering device.
Figure 7:
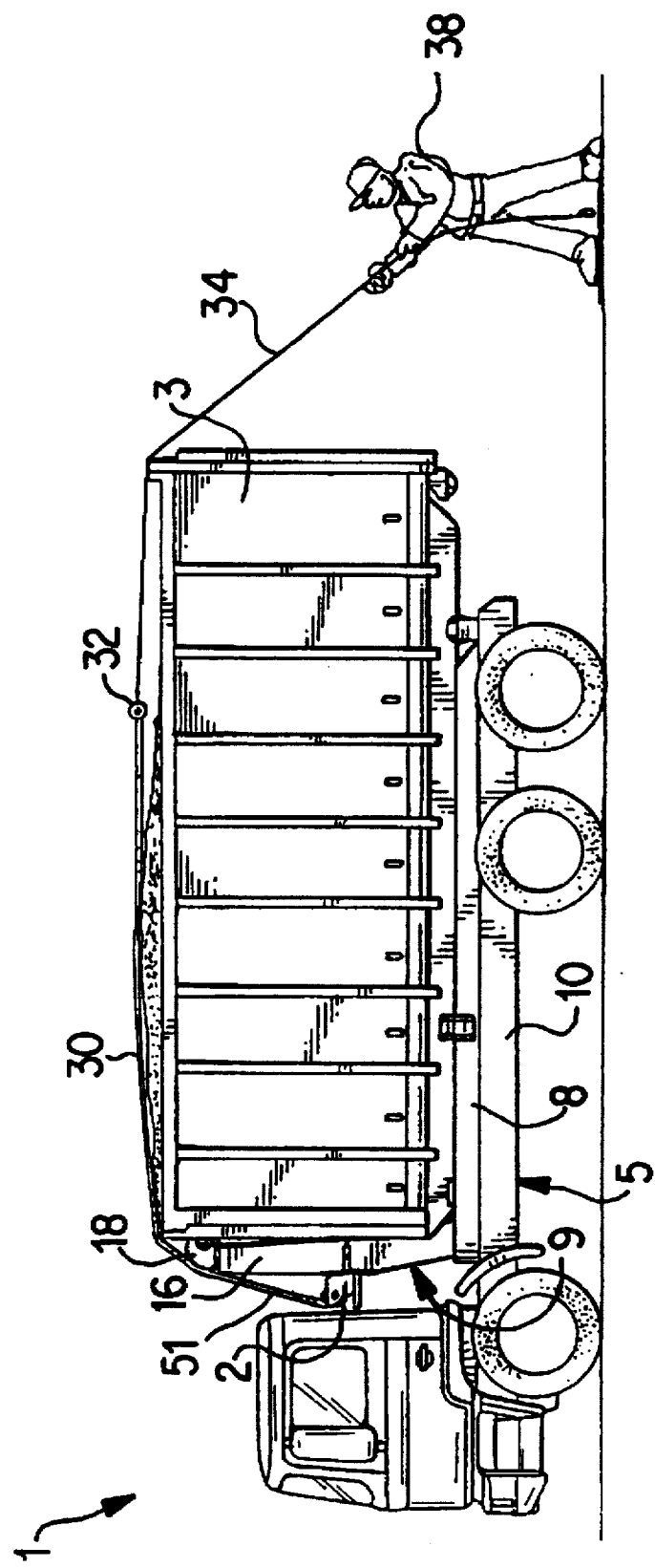
FIG. 7 is a side view of the vehicle, wherein the container is being uncovered.

A covering device 2 is attached to hook arm 9 to facilitate covering of a container 3 (FIGS. 1 and 2). Covering device 2 includes a casing 24 and a roller bar 26 rotatably secured to the casing. Casing 24 can be adjusted in width to accommodate different sized trucks, but is preferably of a non-adjustable unitary condition for greater strength. Tarp 30 is rolled onto roller bar 26 when in a stored position. Tarp 30 is preferably a light-weight, tightly woven polypropylene to provide a suitable covering with a generally slippery surface. Nevertheless, other similar materials could be used.

Roller bar 26 is preferably spring loaded in a conventional manner to automatically retract the extended tarp onto roller bar 26 when tarp 30 is detached from the container. Nonetheless, the tarp could be moved manually, such as with a crank, or via a motor. While one end of tarp 30 is securely fixed to roller bar 26, the other end is secured to a pull-bar 32. Pull-bar 32 provides rigidity to the distal end of tarp 30 when the tarp is extended to cover container 3 or retracted onto roller bar 26. A detachable pull-rope 34 is preferably attached to pull-bar 32 to manually dispense the tarp and control its retraction. In the preferred construction, covering device 2 is secured to hook arm 9 by direct welding of casing 24 to hook arm 9, and by mounting brackets 36. Of course, other known fastening arrangements could be used.

In use, vehicle 4 backs up to a container 3 unsupported by the vehicle. Ordinarily the container will be at ground level, although the containers could be placed on other supporting surfaces. Hook arm 9 is adjusted by cylinder 12 to position covering device 2 at or above the upper edge of container 3 or the top of a heaped load if extending above the container. The pivotal attachment of the hook arm enables covering device 2 to be moved horizontally rearward to a position near the front of container 3, and vertically to a position above the load of the container. As can be appreciated, covering device 2 can be positioned by hook arm 9 at a wide variety of heights to accommodate containers which have walls with different heights. A pull-rope 34, attached to pull-bar 32, is manually pulled to dispense tarp 30 against the bias of roller bar 26 (FIG. 3). Container 3 is thereby covered with tarp 30 by an operator 38 pulling pull-rope 34 toward the rear of container 3. Preferably, pull-rope 34 has a clip member (not shown) so that it can be readily attached to and detached from pull-bar 32. Also, pull-rope 34 should have a sufficient length for operator 38 to conduct the entire covering operation from the ground level. Further, by covering the container at ground level, the manual pulling operation has less of a downward aspect than when the container is on the truck. As a result, the covering procedure is more easily accomplished. Although FIG. 3 shows hook arm 9 in the close proximity to container 3, the arm can be at any convenient position for the covering of container 3. Container 3 can also be hooked by, hook arm 9 either before or after container 3 is covered with tarp 30.

After tarp 30 is pulled over the entire container 3, pull-rope 34 is secured (e.g., by tying to a bar, hook or the like), to the rear end wall 40 of container 3 to prevent retraction of the tarp (FIG. 4). Alternatively, pull-bar 32 could be directly secured to end wall 40 by a known fastener. The sides of tarp 30 includes flaps 41 and grommets 42 or the like to enable stretch ropes 44, bungee cords or the like to secure tarp 30 to the sides of the container. Container 3 includes hooks 46, bars or other structure on the sides of the container for attachment of ropes 44. With container 3 at ground level, the operator need not climb up on the truck, high above the ground, to pull down and secure ropes 44 and flaps 41 to the sides of the container. Covering system 1, thus, facilitates an easier covering operation with less risk of injury to the operator.

Once tarp 30 is, secured over container 3, hook 18 is engaged and hooked to bracket 47 at the front end of container 3 (FIG. 1). Fluid cylinder 12 is actuated so that hook arm 9 pulls container 3 onto vehicle 4 in a known manner (FIG. 5). As the hook arm loads container 3 onto vehicle 4, covering device 2 is swung below the upper edge of the container. As a result, the tarp is pulled down tight over the front edge of the container to resist a stream of air from flowing beneath the tarp during transport (FIG. 6). In addition, the proximal end 51 of tarp 30 that overlies the front of container 3 preferably has an open mesh configuration to alleviate the effect of wind billowing up beneath the tarp.

After transport, ropes 44 are disconnected to release flaps 41 of tarp 30. Flaps 41 retract automatically due to stretch ropes 44 which when released fold flaps 41 on top of tarp 30. Container 3 can then be uncovered while on bed 10 of vehicle 4 by untying pull-rope 34 and permitting the spring biased roller bar 26 to retract the tarp. The operator normally controls the retraction through pull-rope 34 to facilitate a smooth even rolling of the tarp onto roller bar 26. Pull-rope 34 is detached from pull-bar 32 after tarp 30 is fully stored onto roller bar 26. Alternatively, the material hauled in container 3 could be unloaded before releasing and retracting the tarp. Further, container 3 could, if desired, be off loaded from the vehicle prior to uncovering the container. The release process would, in either case, remain the same.

The present invention is described in terms of preferred embodiment thereof. Other embodiments, features, and variation within the scope and spirit of the appended claims will occur to persons skilled in the art from a review of this disclosure.

We claim:

1. A covering system for covering an open top of a container removable from a vehicle, said covering system comprising an arm having an element for grasping a container to load the container onto a vehicle, and a covering device mounted to said arm, said covering device including a tarp which is movable between an extended position for covering a container unsupported by the vehicle and a retracted position.

2. A covering system in accordance with claim 1 in which said arm includes a first segment secured for pivotal movement on a vehicle and a second segment which includes said grasping element, wherein said first and second segments are oriented at an angle to one another.

3. A covering system in accordance with claim 2 in which said covering device is attached to said second segment of said arm.

4. A covering system in accordance with claim 1 in which said covering device further includes a spring-biased rod upon which said tarp is rolled in the retracted position.

5. A covering system in accordance with claim 1 in which said covering device further includes a pull bar attached to a free end of said tarp.

6. A covering system in accordance with claim 1 in which each side of said tarp includes flaps which extend over the sides of the container, wherein each said flap includes a series of fastening elements and stretch ropes connected thereto to secure said tarp to the container.

7. A covering system for covering an open top of a container removable from a vehicle including a framework with a forward end and a rearward end for supporting a container, said covering system comprising an arm having a proximal end and a distal end, said proximal end being attached to a vehicle, said arm being movable so that said distal end is positionable beyond the rearward end of the framework near a container unsupported by the vehicle, and a covering device attached to said distal end of said arm including a tarp which is movable between an extended position to cover the container unsupported by the vehicle and a retracted position.

8. A covering system in accordance with claim 7 in which said arm includes a grasping element on said distal end for grasping and loading the container onto the vehicle.

9. A covering system in accordance with claim 8 in which said arm includes a first segment pivotally attached to the vehicle and a second segment which includes said grasping element, wherein said first and second segments are oriented at an angle to one another.

10. A covering system in accordance with claim 9 which further includes at least one actuator for pivotally moving said arm.

11. A hook lift truck comprising:

a bed attached to a chassis for supporting a container;

an arm pivotally connected to said bed, said arm having a element for grasping a container to load the container onto said bed;

at least one actuator for moving said arm; and a covering device mounted to said arm, said covering device including a tarp, said tarp being movable between an extended position for covering the container unsupported by said vehicle and a retracted position.

12. A hook lift truck in accordance with claim 11 in which said arm has a proximal segment and a distal segment which are substantially normal to one another.

13. A hook lift track in accordance with claim 12 in which said covering device is mounted on said distal segment of said arm.

14. A hook lift truck in accordance with claim 11 in which said covering device includes a spring element for biasing said tarp toward said retracted position.

15. A method of covering a container with a tarp to prevent loss of loaded material during transport of the container, said method comprising:

providing a vehicle having a support structure and a covering device mounted on said support structure said covering device including a tarp movable between an extended position and a retracted position;

extending said tarp over a container which is unsupported by the vehicle;

securing the extended tarp to the container; and loading the covered container onto the vehicle for transport.

16. A method in accordance with claim 15 in which the container is set on ground level during said covering step.

17. A method in accordance with claim 15 in which said loading of the covered container is effected by the support structure.

18. A method in accordance with claim 15 in which said extending of the tarp is effected by manually pulling a rope connected to a free end of the tarp.

19. A method in accordance with claim 15 in which said support structure is moved to position the covering device adjacent and above the container prior to said extending of the tarp over the container.

20. A method in accordance with claim 15 which further includes retracting the tarp by an operator on the ground when the loaded container is supported by the vehicle.

* * * * *